United States Patent [19]

Zurla

[11] 3,962,574

[45] June 8, 1976

[54] LAMP WITH PROTECTIVE HOUSING OR JUNCTION BOX FOR SPLICED ELECTRICAL CONDUCTING WIRES

[75] Inventor: Nick Zurla, Chicago, Ill.

[73] Assignee: Beatric Foods Company, Chicago, Ill.

[22] Filed: June 30, 1975

[21] Appl. No.: 591,519

[52] U.S. Cl. .......................... 240/81 BS; 174/72 R; 174/138 F; 220/3.94; 220/8

[51] Int. Cl.² ...................... F21S 1/12; F21V 25/00; H02G 3/08

[58] Field of Search........... 174/50, 53, 71 R, 72 R, 174/91, 135, 138 F; 200/203; 206/409; 220/3.94, 8, 306, 307; 240/81 BS; 242/129, 137, 138, 146, 170

[56] References Cited

UNITED STATES PATENTS

| | | | |
|---|---|---|---|
| 1,132,925 | 3/1915 | Gillette | 220/306 |
| 1,537,253 | 5/1925 | Miller | 242/146 X |
| 2,625,616 | 1/1953 | Parsons | 220/8 X |
| 2,670,870 | 3/1954 | Fleischer | 220/3.94 |
| 3,770,873 | 11/1973 | Brown | 174/53 |

*Primary Examiner*—Laramie E. Askin
*Attorney, Agent, or Firm*—Max R. Kraus

[57] ABSTRACT

A protective housing or junction box formed of a fireproof or fire resistant material which receives and houses therewithin the spliced ends of electrical conducting wires. The housing is positioned within the base of a lamp.

10 Claims, 6 Drawing Figures

LAMP WITH PROTECTIVE HOUSING OR JUNCTION BOX FOR SPLICED ELECTRICAL CONDUCTING WIRES

This invention relates to a protective housing or junction box for spliced electrical conducting wires and has particular application to lamps.

In lamps and the like, particularly where three-way switches are supported on the base, the electrical conducting wires have to be mechanically spliced to other conducting wires, with said splices positioned in the base of the lamp. Such mechanical splicings when positioned in the base of the lamp have certain disadvantages and present a fire hazard and as a consequence are not approved by Underwriters Laboratories. One of the objects of this invention is to provide a very simple and inexpensive fireproof or fire resistant housing or junction box formed of two parts within which the splices are positioned so that the splices are wholly contained within the housing or junction box to obviate the fire hazard and danger heretofore resulting and permitting a lamp construction which can be approved by Underwriters Laboratories.

Another object of this invention is to provide a fireproof or fire resistant housing or junction box of a plastic material having accepted thermo rating, formed of two sections which are detachably secured and which retain the spliced ends of the conducting wires to protect the splicings.

Another object of this invention is to provide a fireproof or fire resistant housing or junction box which is adapted to receive the spliced ends of electrical conducting wires so that the spliced ends can be readily inserted into and retained in the housing and supported within the base of a lamp, the housing being formed of a pair of sections, each section having an opening so that when the sections are interlocked, the combined openings form a passageway for the conducting wires and retain the spliced ends within the housing.

The table lamp, generally designated at 10, includes a hollow base 12 which is formed preferably of a cast metal. The base 12 supports an upright (not shown) which in turn supports the conventional lamp socket generally indicated at 14, and lamp shade (not shown). Mounted on the base is a conventional three-way switch generally indicated at 16. Three short electrical conducting wires 18, 20 and 22, respectively, are connected to said switch with the opposite ends of said electrical conducting wires adapted to be spliced to other electrical conducting wires, as will be hereinafter described.

Figure 2:
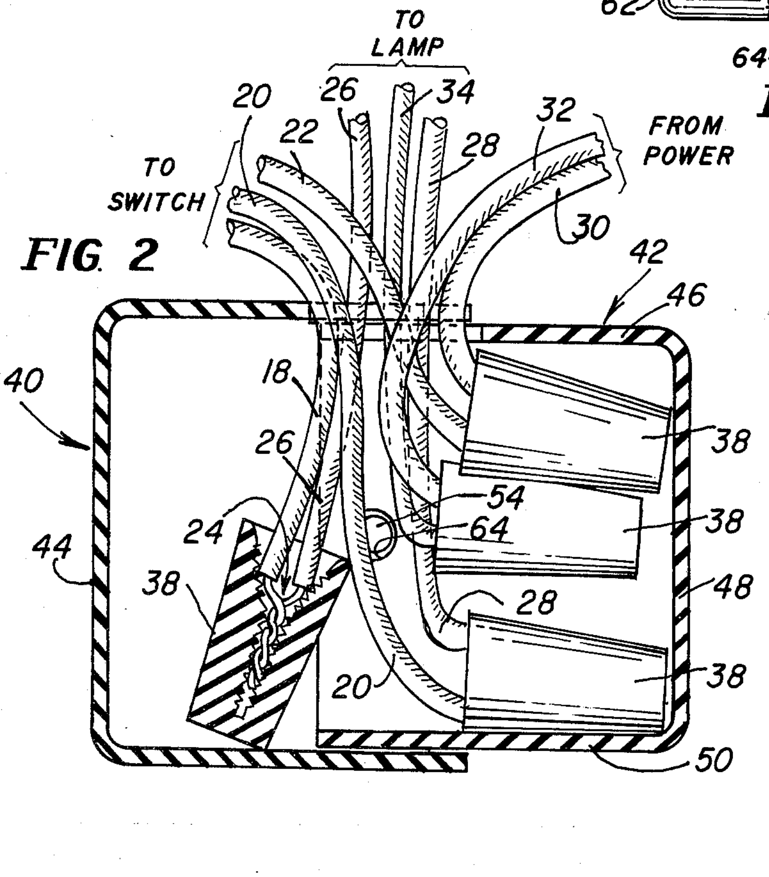
FIG. 2 is an enlarged sectional view of the housing or junction box with the spliced conductors therein and a sectional view of one of the caps which covers the spliced ends.
Figure 6:
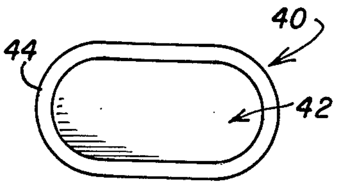
FIG. 6 is a view taken on line 6—6 of FIG. 5.

As best shown in FIG. 2, conducting wire 18 is spliced as at 24 to conducting wire 26, which is connected to the electrical socket 14. Conducting wire 20 is spliced to conducting wire 28 which in turn is also connected to the socket 14. Conducting wire 22 is spliced to conducting wire 30 which in turn is connected to the electrical plug which is connected to a current supply. Conducting wire 32 which is also connected to the electrical plug is spliced to another conducting wire 34 which in turn is connected to the electrical socket 14. Conducting wires 30 and 32 extend through an opening 36 in the side of the base 12. Thus, as shown in connection with a three-way switch there are four splicings and each of these splicings is covered by a conventional plastic protective cap generally indicated at 38 which is internally threaded and which is screwed onto the spliced ends of each of the pairs of wires. These splicings are all positioned within the interior of the base.

This invention provides a protective housing or junction box formed of a plastic material which is fireproof or fire resistant and which is so constructed that it may be readily applied in a minimum of time to enclose the spliced ends of the conducting wires so that the spliced ends and protective caps are contained within the housing or junction box. The housing or junction box generally designated at 40 is best shown in FIGS. 2, 3, 4 and 5 and comprises a pair of sections 42 and 44. Both of the sections are generally oval-shaped in cross-section, with section 44 being the larger section to receive the smaller section 42. Section 42 has a continuous wall 46 which forms the body of said section and has a rear closed end 48, the front end 49 of said section being open. The continuous wall 46 comprises spaced flat sides 50 which merge into rounded side ends 52. On each of the spaced flat sides 50 of the body and spaced from the open end 49 is a nipple or projection 54 of rounded configuration. Extending inwardly into one of the rounded side walls 52 is an elongated cutout of opening 56 which extends to the front or open end 49.

The other housing or box section 44 is similarly shaped but is of a larger dimension to permit the section 42 to telescope therewithin to a limited extent. The body of section 44 comrises a continuous wall 58 and a rear closed end 60. The spaced flat sides 62 have openings 64 adapted to receive the projections 54 and detachably lock the two sections together. One of the rounded side walls 66 of section 44 has an elongated cutout or opening 68 which extends to the front or open end 70.

Figure 5:
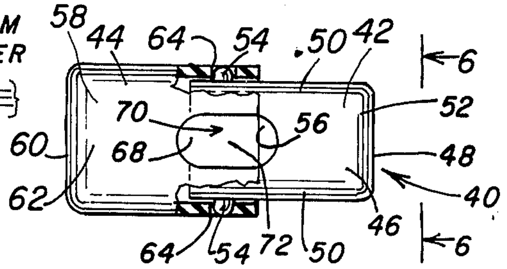
FIG. 5 is a view of the sections interlocked to form the housing or junction box.

When the two sections 42 and 44 are interlocked, as best seen in FIGS. 2 and 5, a portion of section 42 fits within section 44 and the two elongated cutouts 56 and 68 are alined to form a single opening 72 through which the conducting wires extend. The two sections of the housing or junction box are each molded of a plastic material such as Cycolac or Lexan "Cycolac" is acrylonitrile-butadiene-styrene, or ABS resin produced by Marbon Chemical Division of Borg Warner Corporation. "Lexan" is a polycarbonate resin put out by General Electric. Both are fire resistant materials and have fireproof qualities.

Figure 1:
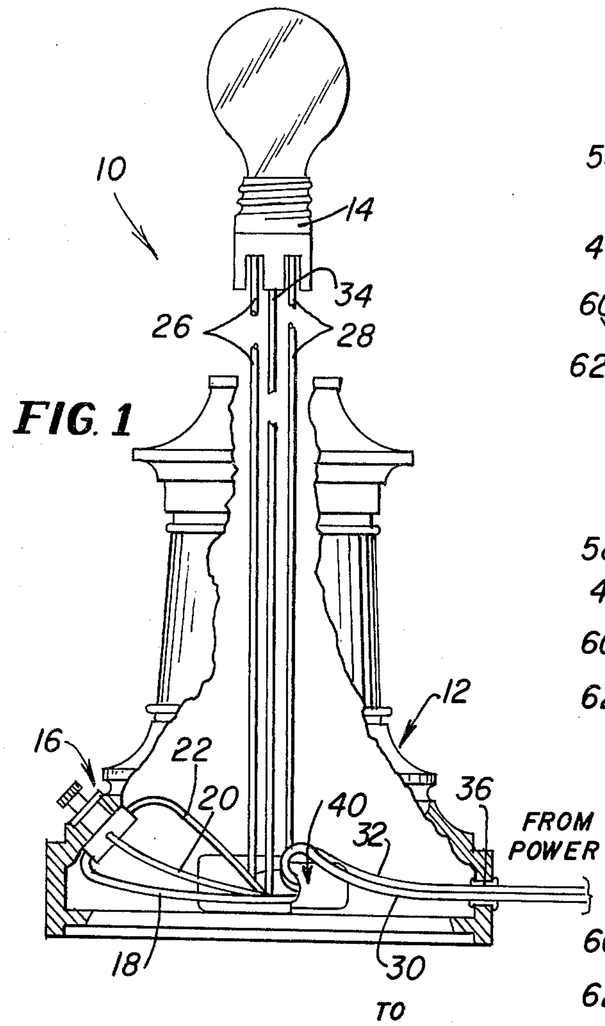
FIG. 1 is a view showing the housing or junction box of this invention within the base of a table lamp and illustrating the conducting wires, switch and electrical socket.
Figure 3:
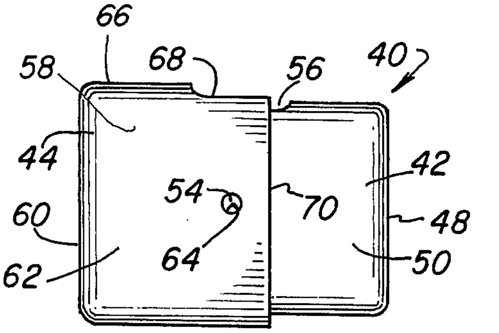
FIG. 3 is a side elevational view of the housing or junction box.
Figure 4:
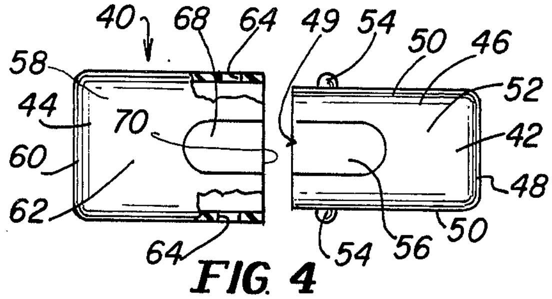
FIG. 4 is a view of the sections separated.

In positioning the spliced ends in the housing 40, they are bunched and held together and said spliced ends with their respective caps are positioned inside one of the sections 42 or 44 so that the spliced ends are contained therewithin and with the conducting wires extending through the respective cutout 56 or 68. The other section is then alined with the first section, with the cutout opening alined with the first cutout opening, and the second section is then pressed inwardly into telescopic relation with the first section until the projections 54 snap into the openings 64. When snapped into the openings, the two sections 42 and 44 are interlocked and the conducting wires extend through both alined openings 56 and 68 which form the single opening 72. The housing or junction box and the splicings are then positioned inside the base of the lamp, as shown in FIG. 1, where the splicings are fully protected.

With this invention there is thus provided a fireproof or fire resistant protective covering for the spliced ends and permits the housing or junction box to be easily applied around the spliced ends in a minimum of time which considerably reduces labor costs and provides a great safety factor.

What is claimed is:

1. A combination comprising a lamp having a base with said lamp supporting an electric lamp socket,a switch on said lamp, a plurality of electrical conducting wires connecting said switch and electric lamp socket to means for connection to an electric power source, said plurality of electrical conducting wires having pairs of electrical conducting wires connected and forming a plurality of pairs of spliced connected ends, a protective housing in said base formed of a plastic fire-resistant material, said protective housing formed of two sections with said sections having means for interlocking said sections to form a single hollow housing, said housing having an opening therein communicating with the interior of said hollow housing, said plurality of electrical conducting wires extending into said housing through said opening with said plurality of spliced connected ends of said conducting wires bunched together and loosely positioned and retained within said housing, with each pair of said spliced connected ends being free for independent movement of other pairs of spliced connected ends in said housing.

2. A structure as set forth in claim 1 in which each of the sections of the protective housing has a closed end and an open end so that the two open ends can be interfitted one within the other and in which each of said sections has an elongated opening along one side thereof communicating with the open end of said section so that when the two sections are interlocked, the openings are aligned to form a single opening for passage of the electrical conducting wires into and out of the protective housing.

3. A structure as set forth in claim 2 in which each pair of spliced wire conductors is covered by a plastic cap and in which the spliced ends together with their respective plastic caps are positioned within the protective housing so that the spliced ends and caps are contained within the housing.

4. A structure as set forth in claim 1 in which the means for interlocking the sections comprises projections on one section engaging openings in the other section.

5. A structure as set forth in claim 1 in which the switch is secured to the base.

6. A structure as set forth in claim 1 in which the plastic fire-resistat material is ABS resin.

7. A structure as set forth in claim 1 in which the plastic fire-resistant material is polycarbonate resin.

8. A structure as set forth in claim 1 in which said switch is a three-way switch and is secured to the base, and in which three conducting wires are connected to said three-way switch with the opposite ends of said three conducting wires spliced to other conducting wires which in turn are connected to the electrical lamp socket and to the means for connection to the power source, with each pair of said splices covered by a protective cap and with said spliced ends and protective caps positioned and supported within said housing.

9. A structure as set forth in claim 8 in which the sections are each of a generally oval shape in transverse section, and in which each of the sections has an opening which when alined forms a single opening for the conducting wires.

10. A structure as set forth in claim 9 in which the opening in each section is adjacent an end of the section.

* * * * *